(12) United States Patent
Hayashi

(10) Patent No.: US 11,960,715 B2
(45) Date of Patent: Apr. 16, 2024

(54) NON-TRANSITORY COMPUTER-READABLE MEDIUM, CHOICE SELECTION METHOD, AND INFORMATION PROCESSING DEVICE

(71) Applicant: Seiko Epson Corporation, Tokyo (JP)

(72) Inventor: Akifumi Hayashi, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 13 days.

(21) Appl. No.: 17/547,454

(22) Filed: Dec. 10, 2021

(65) Prior Publication Data
US 2022/0187984 A1 Jun. 16, 2022

(30) Foreign Application Priority Data
Dec. 11, 2020 (JP) ................... 2020-205766

(51) Int. Cl.
G06F 17/00 (2019.01)
G06F 3/04812 (2022.01)
G06F 3/04847 (2022.01)
G06F 3/04883 (2022.01)

(52) U.S. Cl.
CPC ...... G06F 3/04883 (2013.01); G06F 3/04812 (2013.01); G06F 3/04847 (2013.01)

(58) Field of Classification Search
CPC ............. G06F 3/04883; G06F 3/04812; G06F 3/04847
See application file for complete search history.

(56) References Cited

U.S. PATENT DOCUMENTS

| | | | | |
|---|---|---|---|---|
| 8,875,041 | B1* | 10/2014 | Desai | G06F 3/04847 715/771 |
| 8,914,152 | B2* | 12/2014 | Scheurer | B25J 9/1666 700/250 |
| 9,707,680 | B1* | 7/2017 | Jules | B25J 9/1661 |
| 10,086,517 | B2* | 10/2018 | Touma | G06F 3/04883 |
| 10,307,911 | B2* | 6/2019 | Higuchi | B25J 9/1697 |
| 10,715,577 | B2* | 7/2020 | Hu | G06F 9/452 |
| 10,768,708 | B1* | 9/2020 | Sills | B25J 13/00 |

(Continued)

FOREIGN PATENT DOCUMENTS

| | | |
|---|---|---|
| JP | H02-015284 U | 1/1990 |
| JP | H10-301745 A | 11/1998 |

(Continued)

*Primary Examiner* — Mohammed H Zuberi
(74) *Attorney, Agent, or Firm* — Harness, Dickey & Pierce, P.L.C.

(57) ABSTRACT

A non-transitory computer-readable medium storing a software switch program for causing a display section to display a touch switch including a knob that is in a state in which the knob selects, of a first choice and a second choice that are in an exclusive relation, the first choice and a guide showing a moving path of the knob from the first choice to the second choice and including a first moving path extending along a first direction and a second moving path extending along a second direction different from the first direction and, when receiving first touch input operation for sliding one of the knob and the guide with respect to the other along the first moving path and second touch input operation for sliding the one of the knob and the guide along the second moving path, switching the state to a state in which the knob selects the second choice.

16 Claims, 8 Drawing Sheets

(56) References Cited

U.S. PATENT DOCUMENTS

| | | | | |
|---|---|---|---|---|
| 10,850,196 B2* | 12/2020 | Kohara | ................. | G06F 3/0416 |
| 10,860,010 B2* | 12/2020 | Shimakawa | ........... | B25J 9/1671 |
| 10,893,913 B2* | 1/2021 | Peine | ..................... | A61B 34/30 |
| 10,947,059 B2* | 3/2021 | Düppre | ..................... | B07C 5/36 |
| 11,065,070 B2* | 7/2021 | Noguchi | ................. | B25J 9/1669 |
| 11,279,044 B2* | 3/2022 | Kapoor | ................ | G05B 19/427 |
| 2005/0265817 A1* | 12/2005 | Blanc | .................... | B65G 57/24 |
| | | | | 414/799 |
| 2010/0013934 A1* | 1/2010 | Saporetti | ............ | G06K 7/10732 |
| | | | | 348/E5.022 |
| 2010/0050106 A1* | 2/2010 | Koizumi | ............. | G06F 3/04847 |
| | | | | 715/771 |
| 2010/0162169 A1* | 6/2010 | Skarp | ................ | H04M 1/72469 |
| | | | | 715/833 |
| 2013/0008223 A1* | 1/2013 | Fries | ......................... | B21F 1/00 |
| | | | | 72/388 |
| 2013/0093709 A1* | 4/2013 | Fujibayashi | ............. | G06F 3/041 |
| | | | | 345/173 |
| 2014/0107834 A1* | 4/2014 | Rodefeld | ............. | B65G 47/244 |
| | | | | 700/230 |
| 2014/0257334 A1* | 9/2014 | Wong | ..................... | A61B 34/76 |
| | | | | 700/264 |
| 2014/0319232 A1* | 10/2014 | Gourlay | ................. | F24F 11/523 |
| | | | | 236/1 C |
| 2015/0190925 A1* | 7/2015 | Hoffman | ................. | B25J 9/161 |
| | | | | 901/47 |
| 2016/0030134 A1* | 2/2016 | Shapter | ................. | A61B 34/30 |
| | | | | 606/130 |
| 2016/0159582 A1* | 6/2016 | Bentsen | ................ | B65G 47/57 |
| | | | | 198/602 |
| 2016/0229052 A1* | 8/2016 | Touma | ................. | B25J 9/1658 |
| 2016/0330040 A1* | 11/2016 | Jeon | ..................... | H04L 12/282 |
| 2016/0345048 A1* | 11/2016 | Kim | ..................... | G06F 3/04845 |
| 2017/0083221 A1* | 3/2017 | Whiten | ................ | G06F 3/04847 |
| 2017/0093277 A1* | 3/2017 | Wasserman | ........ | H02M 7/53871 |
| 2017/0178239 A1* | 6/2017 | Messina | .............. | G06F 3/04892 |
| 2017/0193706 A1* | 7/2017 | Lo | ........................ | G06T 19/006 |
| 2017/0330479 A1* | 11/2017 | Bowman | ................. | G09B 7/04 |
| 2018/0107320 A1* | 4/2018 | Im | ........................... | B60Q 9/00 |
| 2018/0185113 A1* | 7/2018 | Gregerson | ............. | A61B 34/35 |
| 2019/0297266 A1* | 9/2019 | Kato | ..................... | B25J 9/1671 |
| 2020/0086354 A1* | 3/2020 | Becher | ..................... | B07C 5/38 |
| 2020/0310635 A1* | 10/2020 | Miyamoto | .......... | G06F 3/04855 |

FOREIGN PATENT DOCUMENTS

| | | |
|---|---|---|
| JP | 2010-214572 A | 9/2010 |
| JP | 2012-108572 A | 6/2012 |
| JP | 2016-206749 A | 12/2016 |

\* cited by examiner

FIG. 14

| SWITCH | OPERATION |
|---|---|
| 7A1 → (ON/OFF switch) | ROTARY BEACON LIGHT IS LIT |
| 7B1 → (OFF/ON switch) | HAND OPENS AND CLOSES |
| 7C1 → (OFF/ON switch) | BELT CONVEYOR MOVES |

FIG. 15

| SWITCH | OPERATION | RISK |
|---|---|---|
| 7A1 → [ON/OFF switch] | ROTARY BEACON LIGHT IS LIT | LOW ▼ |
| 7B1 → [OFF/ON switch] | HAND OPENS AND CLOSES | MEDIUM ▼ |
| 7C1 → [OFF/ON switch] | BELT CONVEYOR MOVES | HIGH ▼ / LOW / MEDIUM / HIGH | ant# NON-TRANSITORY COMPUTER-READABLE MEDIUM, CHOICE SELECTION METHOD, AND INFORMATION PROCESSING DEVICE The present application is based on, and claims priority from JP Application Serial Number 2020-205766, filed Dec. 11, 2020, the disclosure of which is hereby incorporated by reference herein in its entirety.

BACKGROUND

1. Technical Field

The present disclosure relates to a non-transitory computer-readable medium, a choice selection method, and an information processing device.

2. Related Art

JP-UM-A-02-015284 (Patent Literature 1) discloses a teaching pendant for performing teaching work for an industrial robot and the like, the teaching pendant including a touch panel as a display section. When the display section is the touch panel, there has been widely known a method of displaying a touch switch on the display section and causing a user to touch the touch switch to control ON/OFF of a switch.

However, in such a method, it is likely that ON/OFF of the switch is unintentionally switched when the user touches the touch switch by some chance.

SUMMARY

A non-transitory computer-readable medium according to an aspect of the present disclosure stores a software switch program for: causing a display section to display a touch switch including a knob that is in a state in which the knob selects, of a first choice and a second choice that are in an exclusive relation, the first choice and a guide showing a moving path of the knob from the first choice to the second choice and including a first moving path extending along a first direction and a second moving path extending along a second direction different from the first direction; and, when receiving first touch input operation for sliding one of the knob and the guide with respect to another along the first moving path and second touch input operation for sliding the one of the knob and the guide along the second moving path, switching the state to a state in which the knob selects the second choice.

A choice selection method according to another aspect of the present disclosure includes: causing a display section to display a touch switch including a knob that is in a state in which the knob selects, of a first choice and a second choice that are in an exclusive relation, the first choice and a guide showing a moving path of the knob from the first choice to the second choice and including a first moving path extending along a first direction and a second moving path extending along a second direction different from the first direction; and, when receiving first touch input operation for sliding one of the knob and the guide with respect to another along the first moving path and second touch input operation for sliding the one of the knob and the guide along the second moving path, switching the state to a state in which the knob selects the second choice.

An information processing device according to still another aspect of the present disclosure is coupled to a robot, and includes a control device configured to display, on a display section, a touch switch including a knob that is in a state in which the knob selects, of a first choice and a second choice that are in an exclusive relation, the first choice and a guide showing a moving path of the knob from the first choice to the second choice and including a first moving path extending along a first direction and a second moving path extending along a second direction different from the first direction and, when receiving first touch input operation for sliding one of the knob and the guide with respect to another along the first moving path and second touch input operation for sliding the one of the knob and the guide along the second moving path, switch the state to a state in which the knob selects the second choice.

BRIEF DESCRIPTION OF THE DRAWINGS

FIG. 14 is an example of a screen displayed on the information processing device.

FIG. 15 is an example of a screen displayed on the information processing device.

DESCRIPTION OF EXEMPLARY EMBODIMENTS

An embodiment is explained below with reference to the drawings.

First Embodiment

Figure 1:
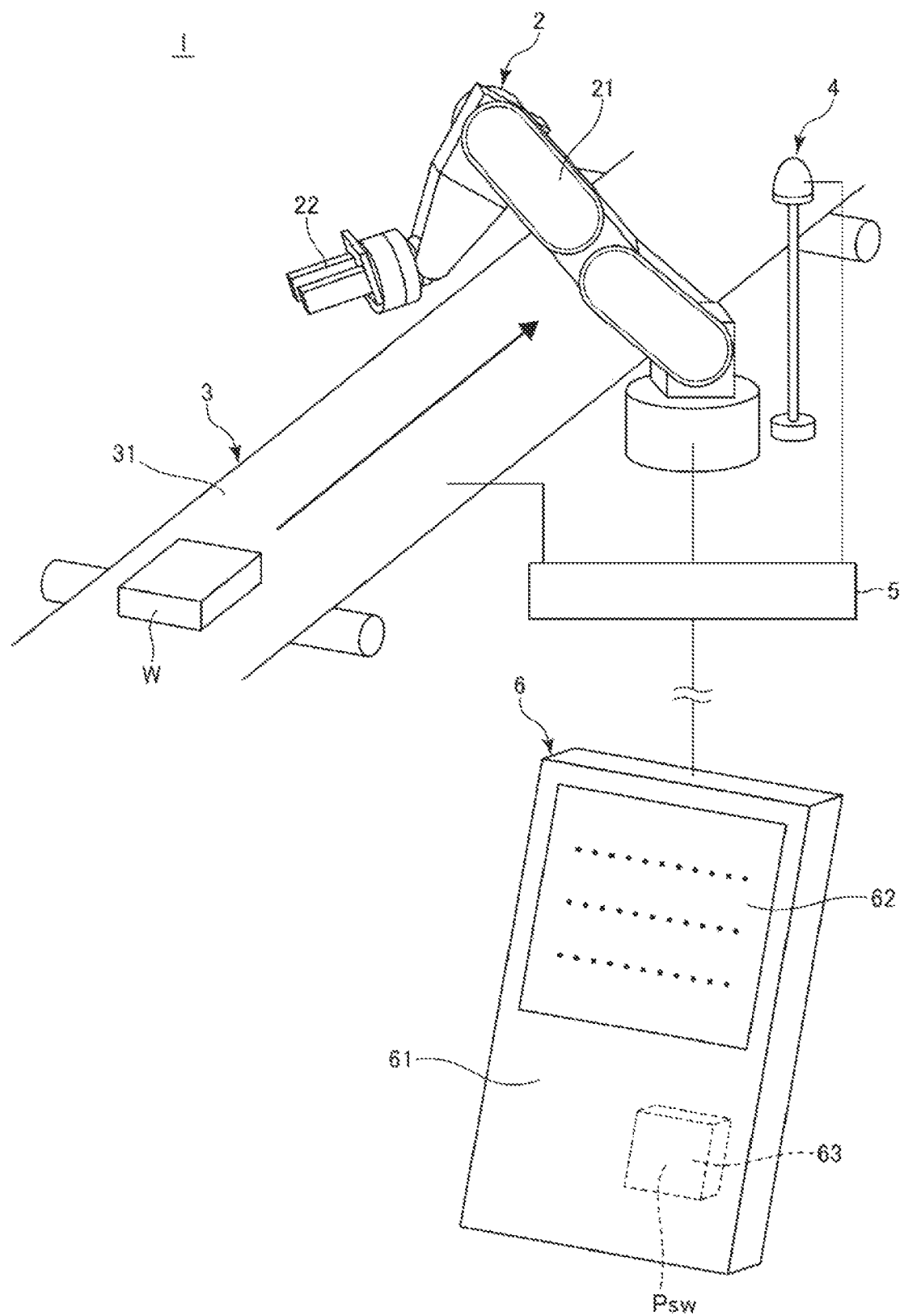
FIG. 1 is a diagram showing an overall configuration of a robot system in a first embodiment.

FIG. 1 is a diagram showing an overall configuration of a robot system in a first embodiment. FIGS. 2 to 13 are respectively diagrams showing examples of touch switches displayed on an information processing device. FIGS. 14 and 15 are respectively examples of screens displayed on the information processing device.

A robot system 1 shown in FIG. 1 includes a robot 2 including a multi-joint arm 21 and a hand 22 attached to the distal end of the multi-joint arm 21, a conveying device 3 including a belt conveyor 31 that conveys a workpiece W, a rotary beacon light 4 provided in the vicinity of the robot 2, and a robot control device 5 that controls driving of the robot 2, the conveying device 3, and the rotary beacon light 4. In such a robot system 1, the conveying device 3 conveys the workpiece W and the robot 2 applies necessary work to the workpiece W being conveyed. The robot system 1 notifies, with the rotary beacon light 4, a state of the robot 2 to an operator present around the robot system 1. However, the robot system 1 is not limited to this.

In such a robot system 1, it is necessary to teach the robot 2 work to be performed on the workpiece W. An information processing device 6 functioning as a teaching pendant is used to perform this teaching work. The information processing device 6 is coupled to the robot control device 5 and used during the teaching work. A coupling method to the robot control device 5 may be any method irrespective of whether the method is a wired or wireless method.

The information processing device 6 includes a housing 61, a display section 62 functioning as a screen, and a control device 63 housed in the housing 61. The control device 63 is configured from, for example, a computer and includes a processor that processes information, a memory communicably coupled to the processor, and an external interface that performs communication with the robot control device 5. Various programs executable by the processor are stored in the memory. The processor reads and executes the various programs and the like stored in the memory. In particular, in the control device 63, a software switch program Psw for controlling a touch switch 7 explained below is included as one of the programs.

The control device 63 executes the software switch program Psw to thereby display, on the display section 62, a GUI (graphic user interface) including the touch switch 7 operable by a user, receives an input from the user with the touch switch 7, and executes processing corresponding to the input. The information processing device 6 has a major characteristic in the shape of the touch switch 7. Therefore, the touch switch 7 is mainly explained below.

Figure 2:
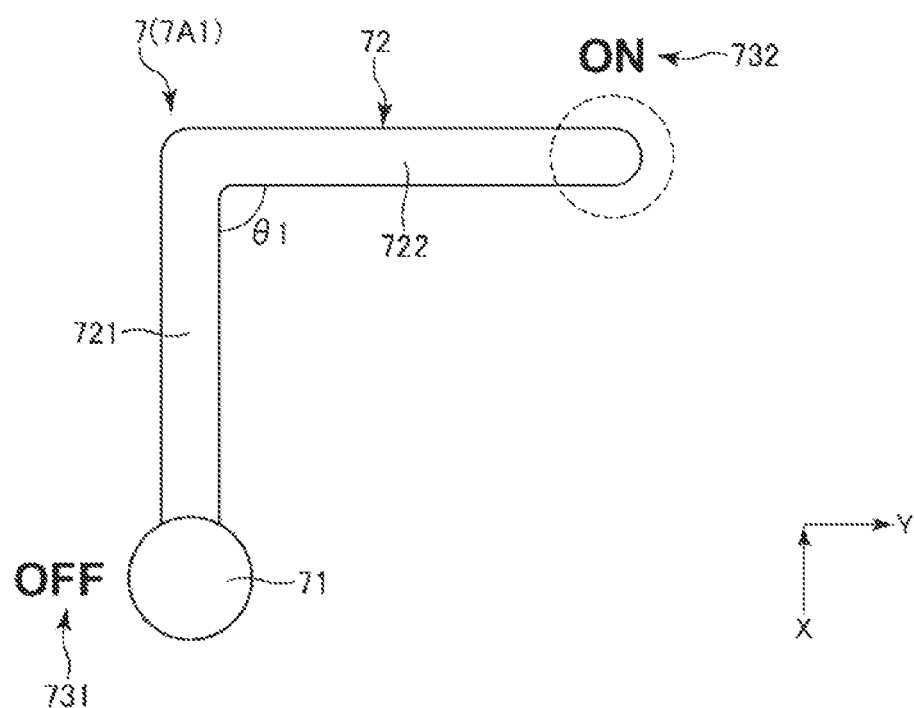
FIG. 2 is a diagram showing an example of a touch switch displayed on an information processing device.

As shown in FIG. 2, the touch switch 7 included in the GUI includes a knob 71 and a guide 72 showing a moving path of the knob 71. "OFF", which is a first choice 731, is disposed on one end side of the guide 72. "ON", which is a second choice 732, is disposed on the other end side. The knob 71 selects the first choice 731 in an initial state, that is, an un-input state. "OFF", which is the first choice 731, and "ON", which is the second choice 732, are in an exclusive relation with each other. That is, selection of the second choice 732 is released if the first choice 731 is selected. Conversely, selection of the first choice 731 is released if the second choice 732 is selected. In the following explanation, for convenience of explanation, a state in which the knob 71 selects the first choice 731 is simply referred to as "OFF state" as well. A state in which the knob 71 selects the second choice 732 is simply referred to as "ON state".

The guide 72 shows a moving path of the knob 71 from the first choice 731 to the second choice 732. The guide 72 has a substantial L shape. The first choice 731 is disposed on one end side of the guide 72 and the second choice 732 is disposed on the other end side. Specifically, the guide 72 includes a first moving path 721 extending straight along a first direction X and a second moving path 722 extending straight along a second direction Y orthogonal to the first direction X. A terminal end of the first moving path 721 and a start end of the second moving path 722 are connected. The first choice 731 is disposed on a start end side of the first moving path 721. The second choice 732 is disposed on the terminal end side of the second moving path 722.

Figure 3:
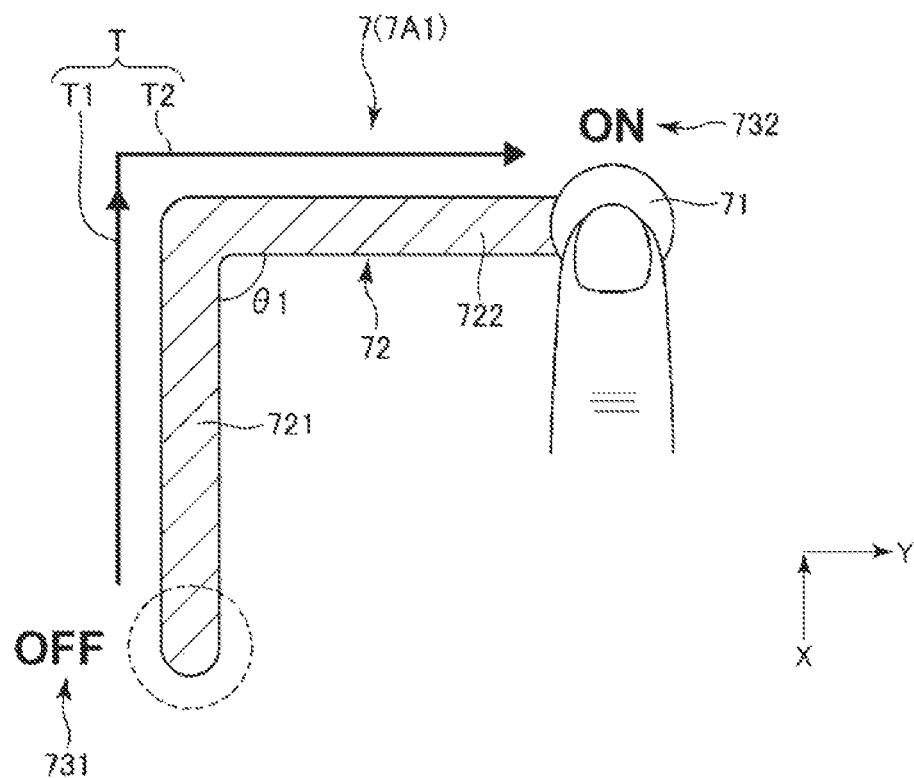
FIG. 3 is a diagram showing an example of a touch switch displayed on the information processing device.

In the software switch program Psw, the touch switch 7 is switched from the OFF state to the ON state when the control device 63 receives, from the user, touch input operation T for "touching the knob 71 on the screen and sliding the knob 71 along the guide 72 to thereby move the knob 71 from the first choice 731 to the second choice 732". Specifically, as shown in FIG. 3, the touch switch 7 is switched from the OFF state to the ON state when the touch switch 7 is in the OFF state and the control device 63 receives the touch input operation T including first touch input operation T1 for sliding the knob 71 from the start end to the terminal end along the first moving path 721 and a second touch input operation T2 for sliding the knob 71 from the start end to the terminal end along the second moving path 722 after the first touch input operation T1.

With such a touch switch 7, the touch switch 7 cannot be switched from the OFF state to the ON state unless the knob 71 is slid in order along directions different from each other. Therefore, it is possible to effectively suppress erroneous operation in which the user touches the touch switch 7 by some chance and a state of the touch switch 7 unintentionally accidentally switched (hereinafter simply referred to as "erroneous operation" as well). As a result, the switch 7 has less erroneous operation and high safety. In particular, as explained above, the terminal end of the first moving path 721 and the start end of the second moving path 722 are connected and the guide 72 is formed by one line. Therefore, it is possible to switch the state of the touch switch 7 by sliding the knob 71 with a single stroke along the guide 72. Therefore, the operation of the touch switch 7 is simplified. It is possible to reduce time and labor for the operation of the touch switch 7.

The touch switch 7 is switched from the ON state to the OFF state by, in the ON state, reversely performing the procedure of the touch input operation T explained above.

An angle θ1 formed by the first moving path 721 and the second moving path 722 is preferably 90° or less. In this embodiment, the angle θ1 is 90°. By setting the angle θ1 to 90° or less in this way, the guide 72 is formed in a shape greatly bent halfway in the guide 72. Therefore, a movement of the knob 71 necessary to switch the touch switch 7 from the OFF state to the ON state is not easily reproduced simply by touching the touch switch 7 by some chance. Therefore, it is possible to more effectively suppress erroneous operation of the touch switch 7. Not only this, but the angle θ1 may be larger than 90°.

When a touch on the knob 71 is released before the knob 71 reaches the second choice 732 from the first choice 731, that is, when a finger of the user is separated from the display section 62 halfway in the touch input operation T and the touch input operation T is suspended, the knob 71 moves to the first choice 731, that is, returns to the initial state. Therefore, to switch the touch switch 7 to the ON state, it is necessary to perform the touch input operation T again from the beginning. Consequently, it is possible to prevent the knob 71 from being gradually moved by an unconscious touch and reaching the second choice 732 soon. Therefore, it is possible to more effectively suppress erroneous operation of the touch switch 7. However, not only this, but, when the touch input operation T is suspended halfway, the knob 71 may stay in a position where the touch input operation T is suspended. The remaining touch input operation T may be able to be resumed from the position.

In the touch switch 7, a state of the guide 72 changes before and after passage of the knob 71. In this embodiment, a color of the guide 72 changes. For example, as shown in FIGS. 2 and 3, the entire guide 72 has an achromatic color in the OFF state. When the knob 71 moves on the guide 72 from the first choice 731 toward the second choice 732, a portion where the knob 71 passes changes to a chromatic color. In the ON state, the entire guide 72 changes to the chromatic color. With such a configuration, the user can easily check a state of the movement of the knob 71. The user can easily check, at a glance whether the touch switch 7 is in the OFF state or the ON state. The color of the guide 72 is not particularly limited. The knob 71 and the guide 72 may be colored in the same color. In this case, a boundary between the knob 71 and the guide 72 may not be displayed to display as if the knob 71 and the guide 72 are connected. The state change is not limited to the change of the color. For example, instead of or in addition to the color, the width of the guide 72 may change before and after the passage of the knob 71. Consequently, it is possible to exert the same effect as the effect of the color change. In this case, the guide 72 may be seen through the knob 71. However, the configuration of the touch switch 7 is not limited to this. The state of the guide 72 may not change before and after the passage of the knob 71.

Figure 4:
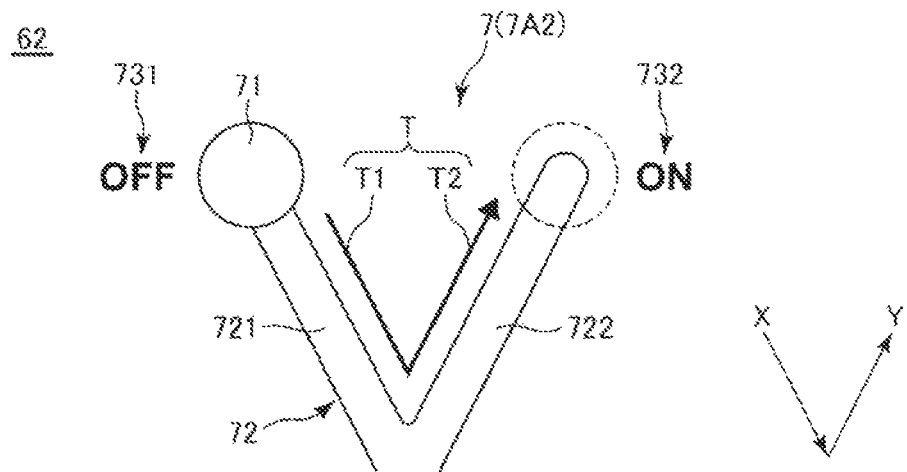
FIG. 4 is a diagram showing an example of a touch switch displayed on the information processing device.
Figure 5:
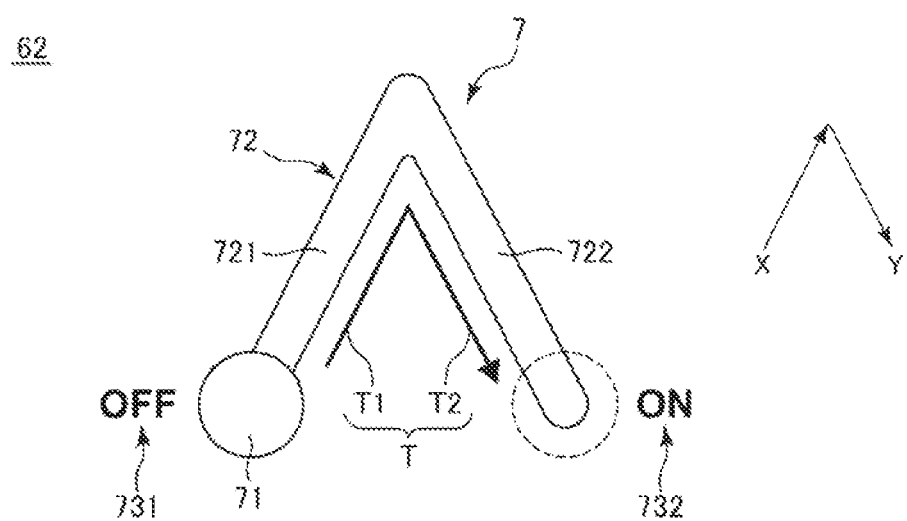
FIG. 5 is a diagram showing an example of a touch switch displayed on the information processing device.
Figure 6:
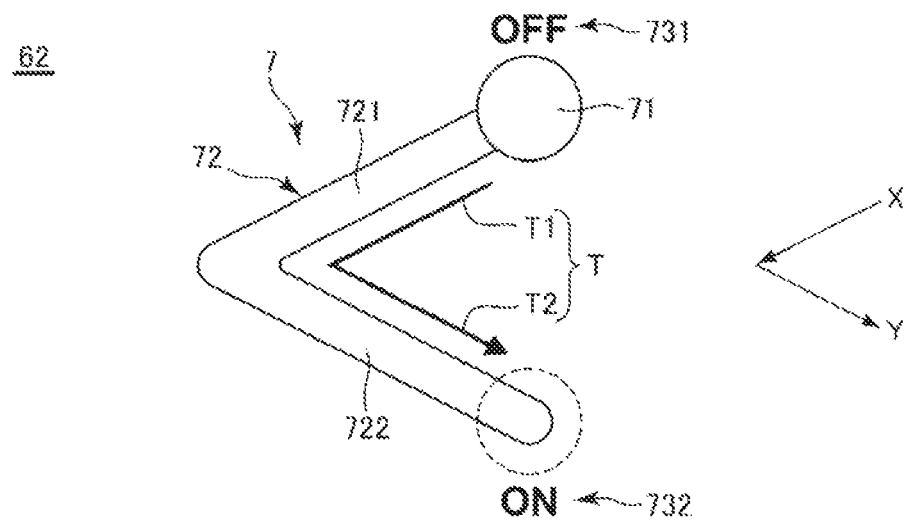
FIG. 6 is a diagram showing an example of a touch switch displayed on the information processing device.

The example of the touch switch 7 is explained above. However, the configuration of the touch switch 7 is not limited to this. For example, as shown in FIG. 4, the guide 72 may have a substantial V shape and the angle θ1 may be less than 90°. By setting the angle θ1 to less than 90° in this way, for example, the guide 72 has a shape more greatly bent halfway in the guide 72 compared with the touch switch 7 shown in FIGS. 2 and 3. Therefore, the movement of the knob 71 necessary to switch the touch switch 7 from the OFF state to the ON state is not easily reproduced simply by touching the touch switch 7 by some chance. Therefore, it is possible to effectively suppress erroneous operation of the touch switch 7. As shown in FIG. 5, the touch switch 7 may have a vertically inverted V shape. As shown in FIG. 6, the touch switch 7 may have a sideway V shape. With the touch switch 7 shown in FIGS. 4 and 5, it is possible to reduce the width of the touch switch 7. With the touch switch 7 shown in FIG. 6, it is possible to reduce the height of the touch switch 7.

Figure 7:
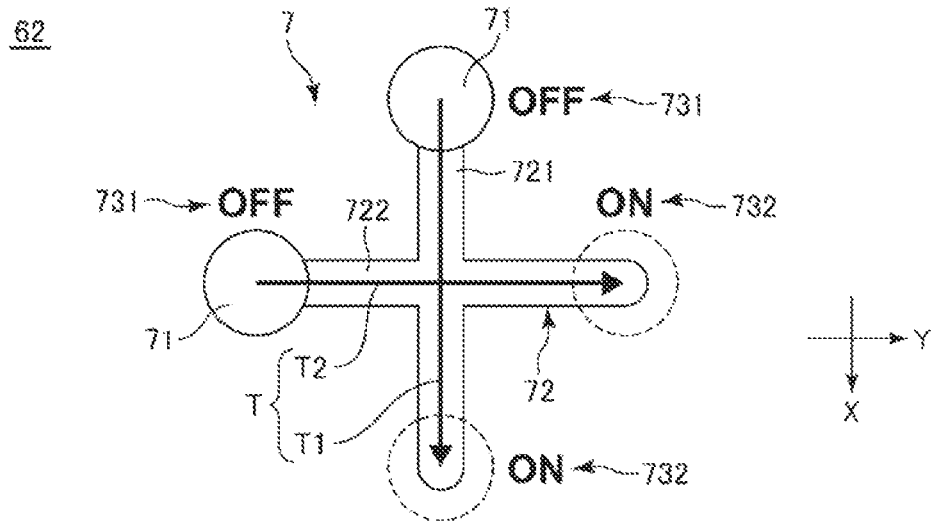
FIG. 7 is a diagram showing an example of a touch switch displayed on the information processing device.
Figure 8:
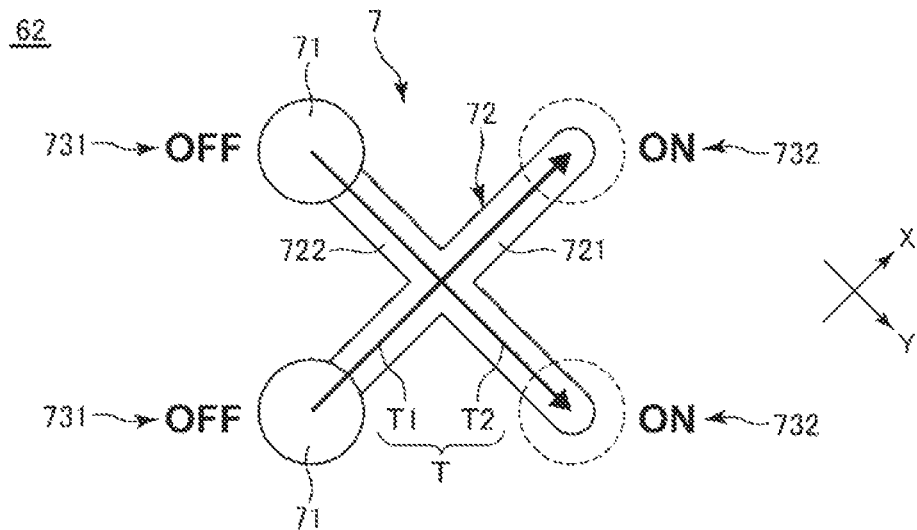
FIG. 8 is a diagram showing an example of a touch switch displayed on the information processing device.
Figure 9:
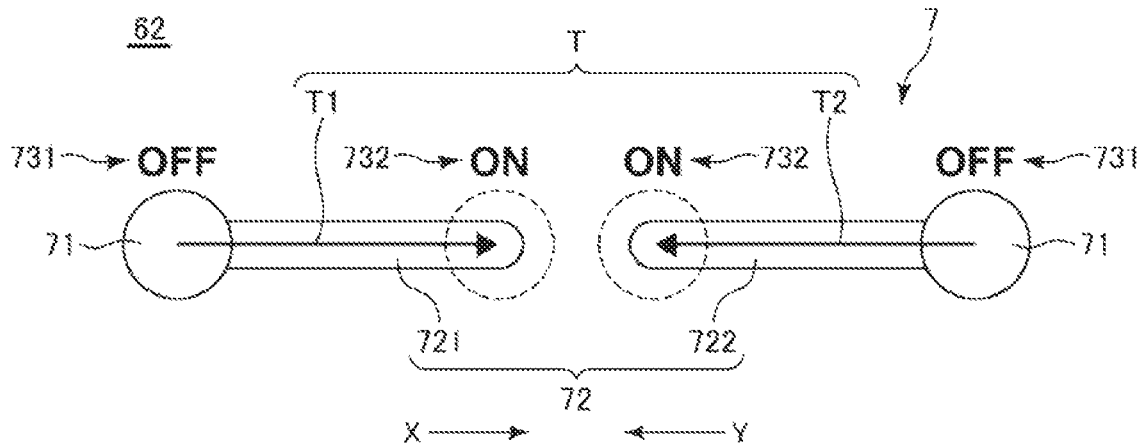
FIG. 9 is a diagram showing an example of a touch switch displayed on the information processing device.

For example, as shown in FIGS. 7, 8, and 9, the terminal end of the first moving path 721 and the start end of the second moving path 722 may be separated. The guide 72 may be formed by two lines. In this case, the touch switch 7 is switched from the OFF state to the ON state when the control device 63 receives the touch input operation T including the first touch input operation T1 for sliding the knob 71 on the first moving path 721 from the start end to the terminal end along the first moving path 721, operation for once separating the finger from the display section 62, and the second touch input operation T2 for sliding the knob 71 on the second moving path 722 from the start end to the terminal end along the second moving path 722. The touch switch 7 is switched from the OFF state to the ON state when the control device 63 receives the touch input operation T for simultaneously performing the first touch input operation T1 and the second touch input operation T2 in a manner of pinch-out and pinch-in used to enlarge and reduce a displayed image. With such a configuration as well, a movement of the knob 71 necessary to switch ON/OFF of the touch switch 7 is not easily reproduced simply by touching the touch switch 7 by some chance. Therefore, it is possible to more effectively suppress erroneous operation of the touch switch 7.

Figure 10:
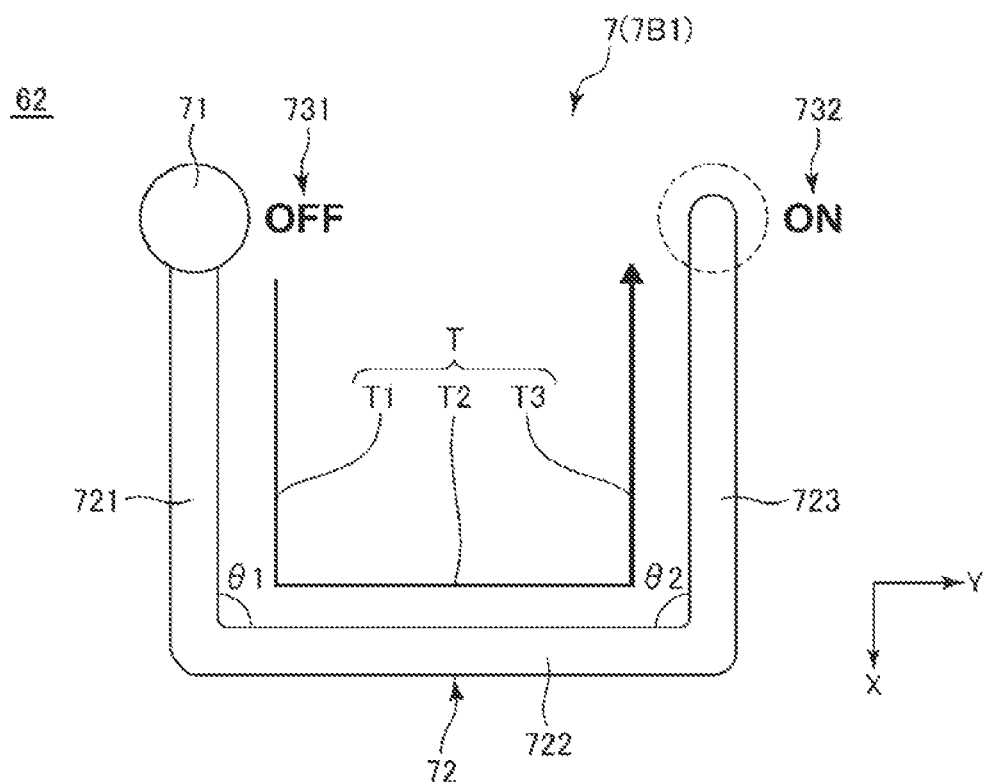
FIG. 10 is a diagram showing an example of a touch switch displayed on the information processing device.
Figure 11:
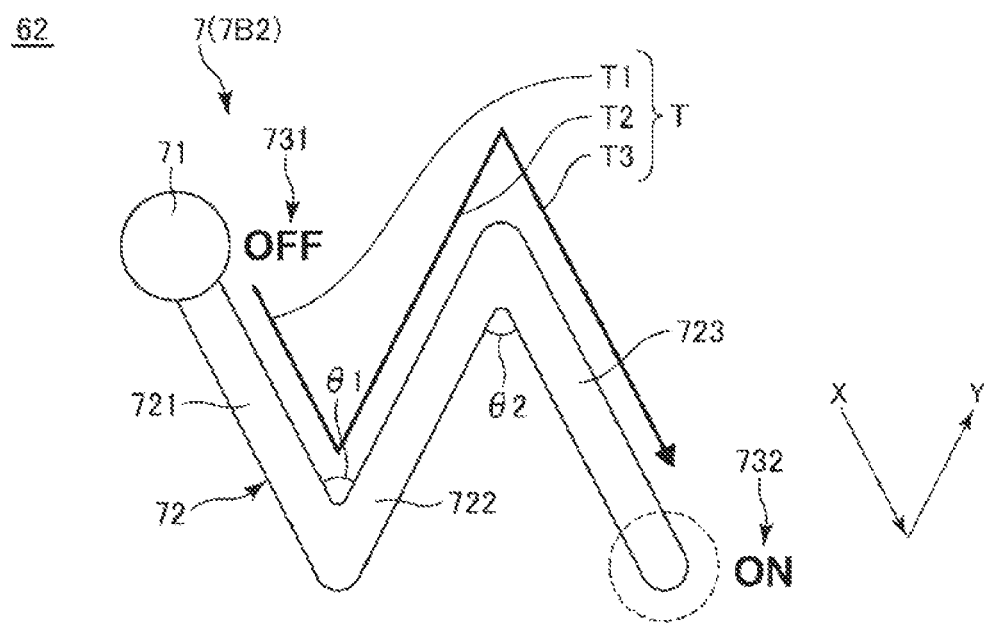
FIG. 11 is a diagram showing an example of a touch switch displayed on the information processing device.

For example, as shown in FIG. 10, the guide 72 may have a substantial U shape. As shown in FIG. 11, the guide 72 may have a substantial Z shape. That is, the guide 72 may have a shape bent twice halfway. These guides 72 include the first moving path 721 extending straight along the first direction X, the second moving path 722 extending straight along the second direction Y, and a third moving path 723 extending straight along the opposite direction of the first direction X. The terminal end of the first moving path 721 and the start end of the second moving path 722 are connected. The terminal end of the second moving path 722 and a start end of the third moving path 723 are connected.

In this case, the touch switch 7 is switched from the OFF state to the ON state when the touch switch 7 is in the OFF state and the control device 63 receives the touch input operation T including the first touch input operation T1 for sliding the knob 71 from the start end to the terminal end along the first moving path 721, the second touch input operation T2 for sliding the knob 71 from the start end to the terminal end along the second moving path 722 after the first touch input operation T1, and third touch input operation T3 for sliding the knob 71 from a start end to a terminal end along the third moving path 723 after the second touch input operation T2.

With the guide 72 further including the third moving path 723 in addition to the first moving path 721 and the second moving path 722, the movement of the knob 71 necessary to switch ON/OFF of the touch switch 7 is more complicated and is not easily reproduced simply by touching the touch switch by some chance. Therefore, it is possible to more effectively suppress erroneous operation of the touch switch 7. In the touch switch 7 shown in FIGS. 10 and 11, the third moving path 723 extends along the opposite direction of the first direction X. However, a direction in which the third moving path 723 extends is not particularly limited if the direction is different from the second direction Y.

An angle θ2 formed by the second moving path 722 and the third moving path 723 is 90° or less like the angle θ1. In the touch switch 7 shown in FIG. 10, the angle θ2 is 90°. In the touch switch 7 shown in FIG. 11, the angle θ2 is less than 90°. By setting the angle θ2 to equal to or less than 90° in this way, the guide 72 is formed in a shape greatly bent halfway. Therefore, the movement of the knob 71 necessary to switch ON/OFF of the touch switch 7 is not easily reproduced simply by touching the touch switch 7 by some chance. Therefore, it is possible to more effectively suppress erroneous operation of the touch switch 7. However, the angle θ2 is not particularly limited and may be set larger than 90°.

Figure 12:
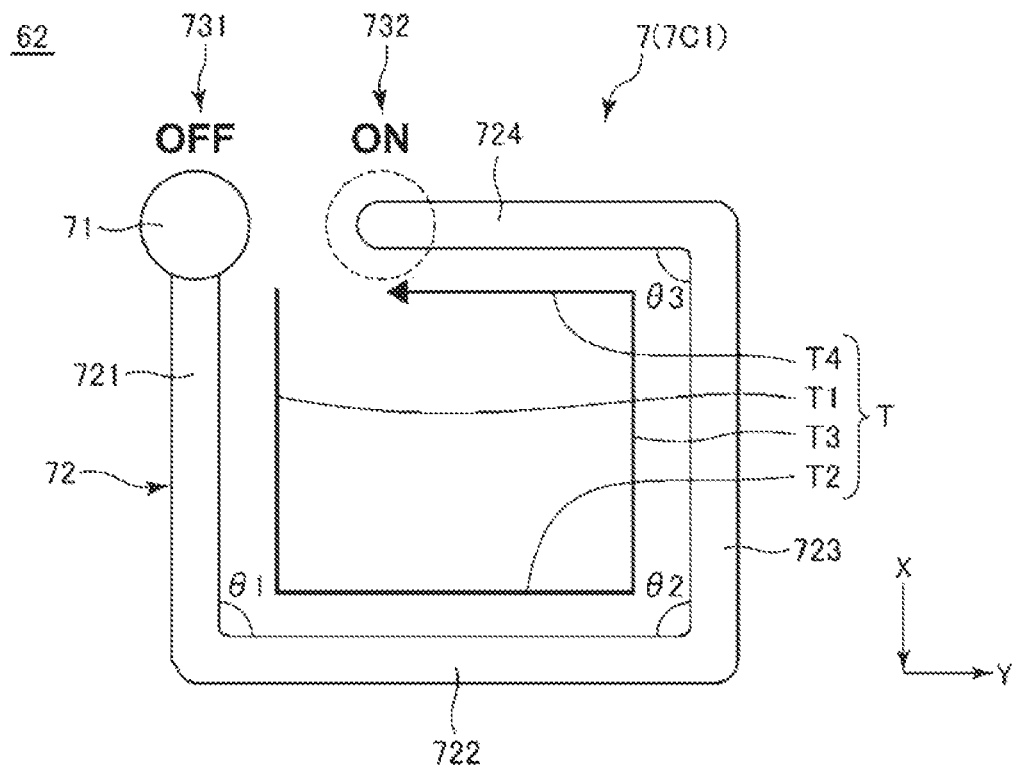
FIG. 12 is a diagram showing an example of a touch switch displayed on the information processing device.
Figure 13:
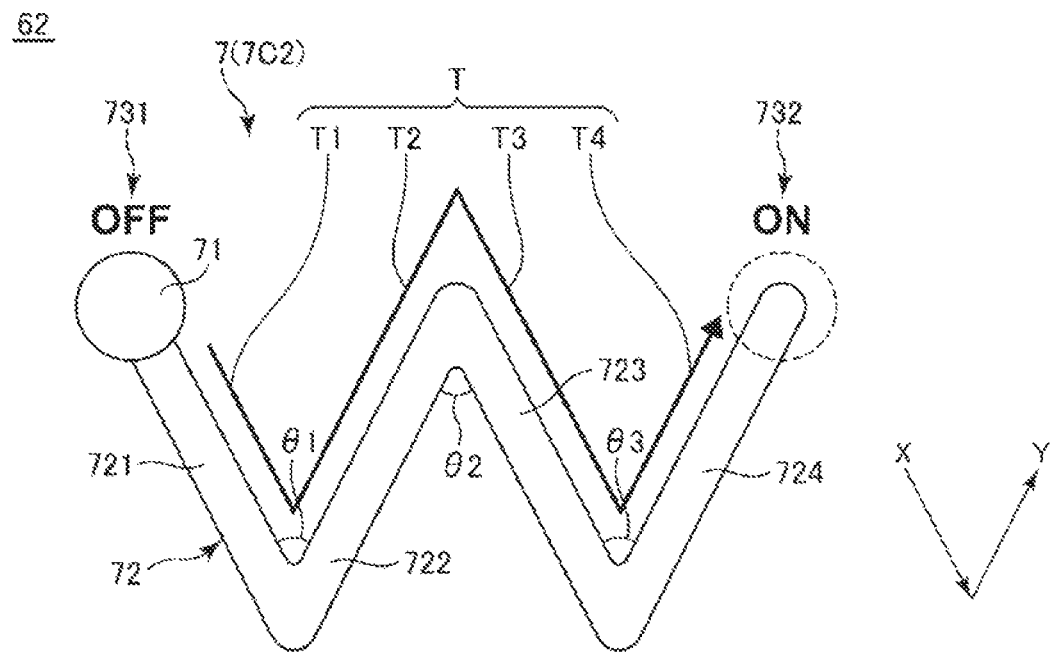
FIG. 13 is a diagram showing an example of a touch switch displayed on the information processing device.

For example, as shown in FIG. 12, the guide 72 may have a substantial O shape. As shown in FIG. 13, the guide 72 may have a substantial W shape. That is, the guide 72 may have a shape bent three times halfway. These guides 72 include the first moving path 721 extending straight along the first direction X, the second moving path 722 extending straight along the second direction Y, the third moving path 723 extending straight along the opposite direction of the first direction X, and a fourth moving path 724 extending straight along the opposite direction of the second direction Y. The terminal end of the first moving path 721 and the start end of the second moving path 722 are connected. The terminal end of the second moving path 722 and the start end of the third moving path 723 are connected. The terminal end of the third moving path 723 and a start end of the fourth moving path 724 are connected.

In this case, the touch switch 7 is switched from the OFF state to the ON state when the touch switch 7 is in the OFF state and the control device 63 receives the touch input operation T including the first touch input operation T1 for sliding the knob 71 from the start end to the terminal end along the first moving path 721, the second touch input operation T2 for sliding the knob 71 from the start end to the terminal end along the second moving path 722 after the first touch input operation T1, the third touch input operation T3 for sliding the knob 71 from the start end to the terminal end along the third moving path 723 after the second touch input operation T2, and fourth touch input operation T4 for sliding the knob 71 from a start end to a terminal end along the fourth moving path 724 after the third touch input operation T3.

With the guide 72 further including the fourth moving path 724 in addition to the first moving path 721, the second moving path 722, and the third moving path 723 in this way, the movement of the knob 71 necessary to switch ON/OFF of the touch switch 7 is more complicated and is not easily reproduced simply by touching the touch switch 7 by some chance. Therefore, it is possible to more effectively suppress erroneous operation of the touch switch 7. In the touch switch 7 shown in FIGS. 12 and 13, the third moving path 723 extends along the opposite direction of the first direction X. However, a direction in which the third moving path 723 extends is not particularly limited if the direction is different from the second direction Y. Similarly, the fourth moving path 724 extends along the opposite direction of the second direction Y. However, a direction in which the fourth moving path 724 extends is not particularly limited if the direction is different from the first direction X.

An angle θ3 formed by the third moving path 723 and the fourth moving path 724 is 90° or less like the angles θ1 and θ2. In the touch switch 7 shown in FIG. 12, the angle θ3 is 90°. In the touch switch 7 shown in FIG. 13, the angle θ3 is less than 90°. By setting the angle θ3 to 90° or less in this way, the guide 72 has a shape greatly bent halfway. Therefore, the movement of the knob 71 necessary to switch ON/OFF of the touch switch 7 is not easily reproduced simply by touching the touch switch 7 by some chance. Therefore, it is possible to more effectively suppress erroneous operation of the touch switch 7. However, the angle θ3 is not particularly limited and may be larger than 90°.

The guide 72 may further include a fifth moving path and a sixth moving path or more moving paths. As the number of moving paths is larger, that is, the number of times the guide 72 is bent halfway is larger, the movement of the knob necessary to switch ON/OFF of the touch switch 7 is complicated and is not easily reproduced simply by touching the touch switch 7 by some chance.

The control device 63 changes, based on the software switch program Psw, according to an operation corresponding to the touch switch 7, the number of moving paths included in the guide 72. Specifically, the control device 63 changes, according to a risk of the operation corresponding to the touch switch 7, the number of moving path included in the guide 72 and increases, as the risk is higher, the number of moving paths included in the guide 72. Consequently, it is possible to suppress erroneous operation of the touch switch 7 corresponding to an operation with a high risk.

For example, if the number of moving paths included in all the touch switches 7 is increased irrespective of a risk with priority given to safety, it is likely that difficulty of the touch input operation T increases and convenience of use of the information processing device 6 decreases. Conversely, if the number of moving paths included in all the touch switches 7 is reduced irrespective of a risk with priority given to convenience of use, it is likely that safety of the information processing device 6 decreases. Therefore, by increasing the number of moving paths included in the guide 72 as the risk of the corresponding operation is higher as explained above, the touch input operation T is simplified for the touch switch 7 corresponding to a safe operation and the touch input operation T is complicated for the touch switch 7 corresponding to a dangerous operation. Therefore, it is possible to achieve both of the safety and the convenience of use.

In the following explanation, the touch switch 7 shown in FIG. 2 is referred to as touch switch 7A1 as well, the touch switch 7 shown in FIG. 4 is referred to as touch switch 7A2 as well, the touch switch 7 shown in FIG. 10 is referred to as touch switch 7B1 as well, the touch switch 7 shown in FIG. 11 is referred to as touch switch 7B2 as well, the touch switch 7 shown in FIG. 12 is referred to as touch switch 7C1 as well, and the touch switch 7 shown in FIG. 13 is referred to as touch switch 7C2 as well. Among these touch switches 7A1 to 7C2, the touch switches 7A1 and 7A2 in which the guide 72 includes two moving paths is classified into a switch group corresponding to an operation with a risk "low", the touch switches 7B1 and 7B2 in which the guide 72 includes three moving paths are classified into a switch group corresponding to an operation with a risk "medium", and the touch switches 7C1 and 7C2 in which the guide 72 includes four moving paths are classified into a switch group corresponding to an operation with a risk "high".

An example is explained below. In the robot system 1 shown in FIG. 1, the information processing device 6 is coupled to the robot control device 5 and the robot control device 5 is coupled to the robot 2, the conveying device 3, and the rotary beacon light 4. The information processing device 6 can control driving of the robot 2, the conveying device 3, and the rotary beacon light 4 via the robot control device 5. In the following explanation, for convenience of explanation, driving of the hand 22 is controlled for the robot 2, driving of the belt conveyor 31 is controlled for the conveying device 3, and lighting of the rotary beacon light 4 is controlled for the rotary beacon light 4.

Among the driving of the hand 22, the driving of the belt conveyor 31, and the lighting of the rotary beacon light 4, an operation with the lowest risk is the lighting of the rotary beacon light 4. Conversely, operation with the highest risk is the driving of the belt conveyor 31. That is, the risks are in a relation of the lighting of the rotary beacon light 4<the driving of the hand 22<the driving of the belt conveyor 31.

Based on the software switch program Psw, as shown in FIG. 14, the control device 63 displays any touch switch 7A1 selected out of the switch group with the risk "low" as the touch switch 7 corresponding to the lighting of the rotary beacon light 4, displays any touch switch 7B1 selected out of the switch group with the risk "medium" as the touch switch 7 corresponding to the driving of the hand 22, and displays any touch switch 7C1 selected out of the switch group with the risk "high" as the touch switch 7 corresponding to the driving of the belt conveyor 31.

By increasing the number of moving paths included in the guide 72 as the risk of the corresponding operation is higher in this way, it is possible to achieve both of the safety and the convenience of use. With the shape of the touch switch 7, it is possible to notify a risk of an operation corresponding to the touch switch 7 to the user. In other words, the user can intuitively grasp that a risk of an operation is higher as the shape of the guide 72 is more complicated (the number of moving paths is larger).

The control device 63 may determine, based on the software switch program Psw, a risk of operation corresponding to the touch switch 7. For example, as shown in FIG. 15, the user may be able to set the risk.

The control device 63 switches, at random, based on the software switch program Psw, the shapes of the touch switches 7 corresponding to operations. Specifically, the control device 63 selects, out of the touch switches 7 belonging to a switch group of the same risk, the touch switch 7 having the shape of the guide 72 different from the shape of the guide 72 of the touch switch 7 displayed last time and displays the touch switch 7.

The touch switch 7 corresponding to the driving of the belt conveyor 31 is explained with reference to an example. When the touch switch 7C1 is displayed in the n-th time (n is a natural number), the touch switch 7C2 having the shape of the guide 72 different from the shape of the guide 72 of the touch switch 7C1 and belonging to the switch group of the same risk is displayed in the immediately following n+1-th time. By not continuously displaying the touch switches 7 having the same shape in this way, it is possible to prevent the user from memorizing the shape of the touch switch 7 corresponding to the driving of the belt conveyor 31. The user less easily gets accustomed to the touch input operation T. Therefore, safety of the information processing device 6 is further improved.

The robot system 1 is explained above. As explained above, the software switch program Psw for the information processing device 6 causes the display section 62 to display the touch switch 7 including the knob 71 that is in the state in which the knob 71 selects, of the first choice 731 and the second choice 732 that are in the exclusive relation, the first choice 731 and the guide 72 showing the moving path of the knob 71 from the first choice 731 to the second choice 732 and including the first moving path 721 extending along the first direction X and the second moving path 722 extending along the second direction Y different from the first direction X and, when receiving the first touch input operation T1 for sliding the knob 71 with respect to the guide 72 along the first moving path 721 and the second touch input operation T2 for sliding the knob 71 along the second moving path 722, switching the state of the knob 71 to the state in which the knob 71 selects the second choice 732. With such a touch switch 7, the touch switch 7 cannot be switched from the OFF state to the ON state unless the knob 71 is slid in order along directions different from each other. Therefore, it is possible to effectively suppress erroneous operation of the touch switch 7. As a result, the touch switch 7 has less erroneous operation and high safety.

In this embodiment, the knob 71 is slid with respect to the guide 72. Conversely, the guide 72 may be slid with respect to the knob 71. That is, one of the knob 71 and the guide 72 only has to be slid with respect to the other.

As explained above, the terminal end of the first moving path 721 and the start end of the second moving path 722 are separated (see, for example, FIG. 8). With such a configuration, the movement of the knob 71 necessary to switch ON/OFF of the touch switch 7 is not easily reproduced simply by touching the touch switch 7 by some chance. Therefore, it is possible to more effectively suppress erroneous operation of the touch switch 7.

As explained above, the terminal end of the first moving path 721 and the start end of the second moving path 722 are connected (see, for example, FIG. 2). With such a configuration, the movement of the knob 71 necessary to switch ON/OFF of the touch switch 7 is not easily reproduced simply by touching the touch switch 7 by some chance. Therefore, it is possible to more effectively suppress erroneous operation of the touch switch 7. In particular, since the guide 72 is formed by one line, it is possible to switch the state of the touch switch 7 by sliding the knob 71 with a single stroke along the guide 72. Therefore, the operation of the touch switch 7 is simplified. It is possible to reduce time and labor for the operation of the touch switch 7.

As explained above, in the software switch program Psw, when a touch on the knob 71 is released before the knob 71 reaches the second choice 732, the knob 71 moves to the first choice 731. That is, when the finger of the user is separated from the display section 62 halfway in the touch input operation T and the touch input operation T is suspended, the knob 71 moves to the first choice 731. Therefore, to switch the touch switch 7 to the ON state, it is necessary to perform the touch input operation T again from the beginning. Consequently, it is possible to prevent the knob 71 from being gradually moved by an unconscious touch and reaching the second choice 732 soon. Therefore, it is possible to more effectively suppress erroneous operation of the touch switch 7.

As explained above, the angle θ1 formed by the first moving path 721 and the second moving path 722 is 90° or less. Consequently, the guide 72 has a shape greatly bent halfway in the guide 72. Therefore, the movement of the knob 71 necessary to switch ON/OFF of the touch switch 7 is not easily reproduced simply by touching the touch switch 7 by some chance. Therefore, it is possible to more effectively suppress erroneous operation of the touch switch 7.

As explained above, the software switch program Psw displays, on the display section 62, the touch switch 7 having the shape of the guide 72 different from the shape of the guide 72 of the touch switch 7 displayed last time. By not continuously displaying the touch switches 7 having the same shape in this way, it is possible to prevent the user from memorizing the shape of the touch switch 7 corresponding to a predetermined operation. The user less easily gets accustomed to the touch input operation T. Therefore, safety of the information processing device 6 is further improved.

As explained above, the guide 72 further includes the third moving path 723 extending along the direction different from the second direction Y. When receiving the third touch input operation T3 for sliding the guide 72 along the third moving path 723 after the second touch input operation T2, the software switch program Psw switches the state of the knob 71 to the state in which the knob 71 selects the second choice 732. Consequently, the movement of the knob 71 necessary to switch ON/OFF of the touch switch 7 is more complicated and is not easily reproduced simply by touching the touch switch 7 by some chance. Therefore, it is possible to more effectively suppress erroneous operation of the touch switch 7.

As explained above, the software switch program Psw changes, according to the operation corresponding to the touch switch 7, the number of moving paths included in the guide 72. Consequently, it is possible to achieve both of safety and convenience of use of the information processing device 6.

As explained above, the software switch program Psw changes the color of the guide 72 before and after the passage of the knob 71. With such a configuration, the user can easily check a state of the movement of the knob 71. The user can easily check, at a glance, whether the touch switch 7 is in the OFF state or the ON state.

As explained above, the choice selection method realized by the software switch program Psw includes causing the display section 62 to display the touch switch 7 including the knob 71 that is in the state in which the knob 71 selects, of the first choice 731 and the second choice 732 that are in the exclusive relation, the first choice 731 and the guide 72 showing the moving path of the knob 71 from the first choice 731 to the second choice 732 and including the first moving path 721 extending along the first direction X and the second moving path 722 extending along the second direction Y different from the first direction X and, when receiving the first touch input operation T1 for sliding one of the knob 71 and the guide 72 with respect to the other along the first moving path 721 and the second touch input operation T2 for sliding the one of the knob 71 and the guide 72 along the second moving path 722, switching the state to the state in which the knob 71 selects the second choice 732. With such a choice selection method, the touch switch 7 cannot be switched from the OFF state to the ON state unless the knob 71 is slid in order along directions different from each other. Therefore, it is possible to effectively suppress erroneous operation of the touch switch 7. As a result, the choice selection method has less erroneous operation and high safety.

As explained above, the information processing device 6 coupled to the robot 2 includes the control device 63 configured to display, on the display section 62, the touch switch 7 including the knob 71 that is in the state in which the knob 71 selects, of the first choice 731 and the second choice 732 that are in the exclusive relation, the first choice 731 and the guide 72 showing the moving path of the knob 71 from the first choice 731 to the second choice 732 and including the first moving path 721 extending along the first direction X and the second moving path 722 extending along the second direction Y different from the first direction X and, when receiving the first touch input operation T1 for sliding one of the knob 71 and the guide 72 with respect to the other along the first moving path 721 and the second touch input operation T2 for sliding the one of the knob 71 and the guide 72 along the second moving path 722, switch the state to the state in which the knob 71 selects the second choice 732. With such an information processing device 6, the touch switch 7 cannot be switched from the OFF state to the ON state unless the knob 71 is slid in order along directions different from each other. Therefore, it is possible to effectively suppress erroneous operation of the touch switch 7. As a result, the information processing device 6 has less erroneous operation and high safety.

The software switch program, the choice selection method, and the information processing device according to the present disclosure are explained above based on the embodiments. However, the present disclosure is not limited to this. The components of the sections can be replaced with any components having the same functions. Any other components may be added to the present disclosure. In the embodiment explained above, an example is explained in which the information processing device 6 is coupled to the robot 2 and used. However, a target to which the information processing device 6 is coupled is not limited to the robot 2.

In the embodiment explained above, the first moving path 721, the second moving path 722, the third moving path 723, and the fourth moving path 724 respectively extend straight along the predetermined directions. However, the first moving path 721, the second moving path 722, the third moving path 723, and the fourth moving path 724 are not limited to this and may extend along the predetermined directions when viewed as a whole. For example, the first moving path 721, the second moving path 722, the third moving path 723, and the fourth moving path 724 may extend while curving or meandering along the predetermined directions.

What is claimed is:

1. A non-transitory computer-readable medium storing a software switch program for operating a robot to perform execution control with respect to a plurality of operations, the software switch program causing a processor to execute a process so as to perform the steps of:
    causing a display to display a touch switch including a knob located at a start position on the display and a guide extending from the knob on the display for an operation of the plurality of operations;
    moving the knob from the start position to an intermediate position on the guide according to a drag operation of an operator in a first direction;
    moving the knob from the intermediate position to an end position on the guide according to the drag operation in a second direction different from the first direction; and
    executing the operation when the processor determines that the knob moves from the start position to the end position,
    wherein, when the processor detects that a touch on the knob is released by suspending the drag operation by the operator before the knob reaches the end position, the processor is configured to move the knob back to the start position,
    the guide is configured with a first path and a second path extending from the first path,
    the first path has first and second ends opposite to each other, and the second path has third and fourth ends opposite to each other,
    the start position is located at the first end of the first path, and the end position is located at the fourth end of the second path,
    the second end of the first path and the third end of the second path correspond to the intermediate position, and
    the first path is inclined with respect to the second path at the intermediate position.

2. The non-transitory computer-readable medium according to claim 1,
    wherein the intermediate position is configured with an intermediate end position and an intermediate start position,
    the processor is further configured to:
        move the knob from the start position to the intermediate end position on the guide according to the drag operation in the first direction; and
        move the knob from the intermediate start position to the end position on the guide according to the drag operation in the second direction, and
    the intermediate end position and the intermediate start position are spaced apart from each other on the display.

3. The non-transitory computer-readable medium according to claim 1,
    wherein, after the knob moves from the start position to the intermediate position on the first path of the guide according to the drag operation in the first direction, the knob continuously moves from the intermediate position to the end position on the second path of the guide according to the drag operation in the second direction, and
    the guide continuously extends from the start position to the end position via the intermediate position along the first and second directions.

4. The non-transitory computer-readable medium according to claim 3,
    wherein an angle formed by the first path of the guide extending along the first direction and the second path of the guide extending along the second direction is 90° or less.

5. The non-transitory computer-readable medium according to claim 1,
wherein the processor is further configured to display another touch switch on the display, and the another touch switch includes the knob and another guide extending from the knob, and
a shape of the guide is different from a shape of the another guide.

6. The non-transitory computer-readable medium according to claim 1,
wherein the intermediate position is configured with a first intermediate position and a second intermediate position, and
the processor is further configured to:
move the knob from the start position to the first intermediate position on the first path of the guide according to the drag operation in the first direction;
move the knob from the first intermediate position to the second intermediate position on the guide according to the drag operation in a third direction different from the second direction; and
move the knob from the second intermediate position to the end position on the second path of the guide according to the drag operation in the second direction.

7. The non-transitory computer-readable medium according to claim 6,
wherein the touch switch is configured with a plurality of touch switches, and
one of the plurality of touch switches has different extending directions of the guide between the start position and the end position than another of the plurality of touch switches.

8. The non-transitory computer-readable medium according to claim 1,
wherein the processor is further configured to change a display color of the guide before and after the knob passes thereon.

9. A choice selection method for causing a processor to execute a process for operating a robot to perform execution control with respect to a plurality of operations, the choice selection method comprising executing on the processor the steps of:
causing a display to display a touch switch including a knob located at a start position on the display and a guide extending from the knob on the display for an operation of the plurality of operations;
moving the knob from the start position to an intermediate position on the guide according to a drag operation of an operator in a first direction;
moving the knob from the intermediate position to an end position on the guide according to the drag operation in a second direction different from the first direction; and
executing the operation when the processor determines that the knob moves from the start position to the end position,
wherein, when the processor detects that a touch on the knob is released by suspending the drag operation by the operator before the knob reaches the end position, the processor is configured to move the knob back to the start position,
the guide is configured with a first path and a second path extending from the first path,
the first path has first and second ends opposite to each other, and the second path has third and fourth ends opposite to each other,
the start position is located at the first end of the first path, and the end position is located at the fourth end of the second path,
the second end of the first path and the third end of the second path correspond to the intermediate position, and
the first path is inclined with respect to the second path at the intermediate position.

10. An information processing device coupled to a robot, the robot performing execution control with respect to a plurality of operations, the information processing device comprising:
a memory configured to store a program; and
a processor configured to execute the program so as to:
cause a display to display a touch switch including a knob located at a start position on the display and a guide extending from the knob on the display for an operation of the plurality of operations;
move the knob from the start position to an intermediate position on the guide according to a drag operation of an operator in a first direction;
move the knob from the intermediate position to an end position on the guide according to the drag operation in a second direction different from the first direction; and
execute the operation when the processor determines that the knob moves from the start position to the end position,
wherein, when the processor detects that a touch on the knob is released by suspending the drag operation by the operator before the knob reaches the end position, the processor is configured to move the knob back to the start position,
the guide is configured with a first path and a second path extending from the first path,
the first path has first and second ends opposite to each other, and the second path has third and fourth ends opposite to each other,
the start position is located at the first end of the first path, and the end position is located at the fourth end of the second path,
the second end of the first path and the third end of the second path correspond to the intermediate position, and
the first path is inclined with respect to the second path at the intermediate position.

11. The non-transitory computer-readable medium according to claim 1,
wherein the processor is further configured to display another touch switch on the display, and the another touch switch includes the knob and another guide extending from the knob,
the intermediate position is configured with a plurality of intermediate positions, and at least one of the plurality of intermediate positions is located on each of the guide and the another guide between the start position and the end position,
the touch switch corresponds to a first operation of the plurality of operations, and the first operation corresponds to a non-moving operation of the robot in which no part of the robot moves,
the another touch switch corresponds to a second operation of the plurality operations, and the second operation corresponds to a moving operation of the robot in which part of the robot moves, and
a first number of the plurality of intermediate positions for the touch switch on the guide is less than a second number of the plurality of intermediate positions for the another touch switch on the another guide.

12. The choice selection method according to claim 9,
wherein the processor is further configured to display another touch switch on the display, and the another touch switch includes the knob and another guide extending from the knob, the intermediate position is configured with a plurality of intermediate positions, and at least one of the plurality of intermediate positions is located on each of the guide and the another guide between the start position and the end position, the touch switch corresponds to a first operation of the plurality of operations, and the first operation corresponds to a non-moving operation of the robot in which no part of the robot moves, the another touch switch corresponds to a second operation of the plurality operations, and the second operation corresponds to a moving operation of the robot in which part of the robot moves, and a first number of the plurality of intermediate positions for the touch switch on the guide is less than a second number of the plurality of intermediate positions for the another touch switch on the another guide.

13. The information processing device according to claim 10,
wherein the processor is further configured to display another touch switch on the display, and the another touch switch includes the knob and another guide extending from the knob, the intermediate position is configured with a plurality of intermediate positions, and at least one of the plurality of intermediate positions is located on each of the guide and the another guide between the start position and the end position, the touch switch corresponds to a first operation of the plurality of operations, and the first operation corresponds to a non-moving operation of the robot in which no part of the robot moves, the another touch switch corresponds to a second operation of the plurality operations, and the second operation corresponds to a moving operation of the robot in which part of the robot moves, and a first number of the plurality of intermediate positions for the touch switch on the guide is less than a second number of the plurality of intermediate positions for the another touch switch on the another guide.

14. The non-transitory computer-readable medium according to claim 1,
wherein the processor is further configured to change a display shape of the guide before and after the knob passes thereon.

15. The choice selection method according to claim 9,
wherein the processor is further configured to change a display shape of the guide before and after the knob passes thereon.

16. The information processing device according to claim 10,
wherein the processor is further configured to change a display shape of the guide before and after the knob passes thereon.

* * * * *